(12) United States Patent
Lazaridis

(10) Patent No.: US 7,881,744 B2
(45) Date of Patent: Feb. 1, 2011

(54) MEDIA TRANSFER AND CONTROL SYSTEM

(75) Inventor: Mihal Lazaridis, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 812 days.

(21) Appl. No.: 11/752,619

(22) Filed: May 23, 2007

(65) Prior Publication Data

US 2008/0254751 A1    Oct. 16, 2008

Related U.S. Application Data

(63) Continuation-in-part of application No. 11/733,403, filed on Apr. 10, 2007.

(51) Int. Cl.
*H04M 1/00* (2006.01)
*H04B 1/38* (2006.01)

(52) U.S. Cl. .................. 455/550.1; 455/74; 455/90.1; 455/90.2; 455/90.3

(58) Field of Classification Search ............... 455/74, 455/550.1, 90.1–90.3, 403; 379/419–440
See application file for complete search history.

(56) References Cited

U.S. PATENT DOCUMENTS

| | | | |
|---|---|---|---|
| 6,218,947 B1 | 4/2001 | Sutherland | |
| 6,300,880 B1 * | 10/2001 | Sitnik | 340/825.25 |
| 6,327,594 B1 | 12/2001 | Van Huben | |
| 6,377,825 B1 | 4/2002 | Kennedy et al. | |
| 6,412,004 B1 | 6/2002 | Chen | |
| 6,791,907 B2 | 9/2004 | Berhan | |
| 7,110,755 B2 | 9/2006 | Shibasaki et al. | |
| 7,308,489 B2 | 12/2007 | Weast | |
| 7,461,067 B2 | 12/2008 | Dewing | |

2001/0006512 A1 * 7/2001 Takabatake et al. ......... 370/329

(Continued)

FOREIGN PATENT DOCUMENTS

EP    1 107 254 A2    6/2001

(Continued)

OTHER PUBLICATIONS

"Audio/video Remote Control Profile", palo wireless Bluetooth Resource Center, retrieved on Feb. 5, 2007 from http://www.palowireless.com/infotooth/tutorial/n2_avrcp.asp.

(Continued)

*Primary Examiner*—Charles N. Appiah
*Assistant Examiner*—Emem Stephen
(74) *Attorney, Agent, or Firm*—Louis B. Allard; Borden Ladner Gervais LLP

(57) ABSTRACT

A media transfer and control system that includes a handheld device and an audio/visual system. The media transfer and control system provides for: (i) the transfer of media files between the handheld device and the audio/visual system, (ii) the transmission of control commands from the handheld device to the audio/visual system for controlling the function and operation of the audio/visual system through a user interface provided on the handheld device, and (iii) the unsolicited transfer of media descriptive data between the handheld device and the audio/visual system to create a synchronized global view on the handheld electronic device and/or the audio/visual system of all of the media content currently stored on and/or available through both the handheld device and the audio/visual system.

20 Claims, 6 Drawing Sheets

U.S. PATENT DOCUMENTS

| | | |
|---|---|---|
| 2001/0028717 A1 | 10/2001 | Ohmura |
| 2001/0045749 A1 | 11/2001 | Camozzi |
| 2002/0019979 A1 | 2/2002 | Koreeda |
| 2002/0032042 A1 | 3/2002 | Poplawsky et al. |
| 2002/0137505 A1 | 9/2002 | Eiche et al. |
| 2002/0173273 A1 | 11/2002 | Spurgat et al. |
| 2003/0013504 A1 | 1/2003 | Park |
| 2004/0034455 A1 | 2/2004 | Simonds et al. |
| 2004/0042350 A1 | 3/2004 | Yamanushi |
| 2004/0068532 A1 | 4/2004 | Dewing |
| 2004/0090121 A1 | 5/2004 | Simonds et al. |
| 2004/0090346 A1 | 5/2004 | Simonds et al. |
| 2004/0092253 A1 | 5/2004 | Simonds et al. |
| 2004/0093154 A1 | 5/2004 | Simonds et al. |
| 2004/0093155 A1 | 5/2004 | Simonds et al. |
| 2004/0098571 A1 | 5/2004 | Falcon |
| 2004/0190529 A1 | 9/2004 | Hara |
| 2004/0243700 A1 | 12/2004 | Weast |
| 2005/0026559 A1 | 2/2005 | Khedouri |
| 2005/0096753 A1* | 5/2005 | Arling et al. .................. 700/11 |
| 2005/0228897 A1 | 10/2005 | Yamamoto |
| 2005/0278080 A1 | 12/2005 | Pilgrim et al. |
| 2006/0004788 A1 | 1/2006 | Pilgrim et al. |
| 2006/0009289 A1 | 1/2006 | McCarten |
| 2006/0036356 A1 | 2/2006 | Rasin et al. |
| 2006/0052144 A1 | 3/2006 | Seil et al. |
| 2006/0129553 A1 | 6/2006 | Simonds et al. |
| 2006/0141925 A1 | 6/2006 | Chagger |
| 2006/0173974 A1 | 8/2006 | Tang |
| 2006/0238504 A1 | 10/2006 | Kunii |
| 2006/0270395 A1 | 11/2006 | Dhawan et al. |
| 2007/0018845 A1 | 1/2007 | Sutardja |
| 2007/0113264 A1 | 5/2007 | Rothschild |
| 2007/0140187 A1 | 6/2007 | Rokusek |
| 2007/0143816 A1* | 6/2007 | Gupta et al. ................. 725/135 |
| 2007/0180485 A1 | 8/2007 | Dua |
| 2007/0299982 A1 | 12/2007 | Armstrong |
| 2008/0186979 A1 | 8/2008 | Kolar |
| 2009/0125609 A1 | 5/2009 | Wood |

FOREIGN PATENT DOCUMENTS

| | | |
|---|---|---|
| EP | 1 113 644 A2 | 7/2001 |
| EP | 1 146 674 A2 | 10/2001 |
| EP | 1 435 752 A | 7/2004 |
| GB | 2 369 964 A | 6/2002 |
| JP | 2001297527 A | 10/2001 |
| JP | 2002057966 A | 2/2002 |
| JP | 2002373484 A | 12/2002 |
| JP | 2003258737 A | 9/2003 |
| JP | 2004022139 A | 1/2004 |
| JP | 2006041702 A | 2/2006 |
| JP | 2007043685 A | 2/2007 |
| KR | 1020020073533 | 9/2002 |
| KR | 1020050027449 | 3/2005 |
| KR | 2006-028910 | 4/2006 |
| KR | 1020070008051 | 1/2007 |
| WO | 2005004397 | 1/2005 |
| WO | 2005076576 A2 | 8/2005 |

OTHER PUBLICATIONS

"Bluetooth Profiles Overview", Bluetooth retrieved on Feb. 5, 2007 from http://www.bluetooth.com/Bluetooth/Learn/Works/Profiles_Overview.htm.

"Cathal's Corner", palo wireless Bluetooth Resource Center, retrieved on Feb. 1, 2007 from http://www.palowireless.com/bluearticles/cc5_newprofiles.asp.

Korean Patent Application No. 10-2008-0033202, Office Action dated Apr. 28, 2010.

Japanese Patent Application No. 2008-102855, Office Action dated Jul. 21, 2010.

* cited by examiner

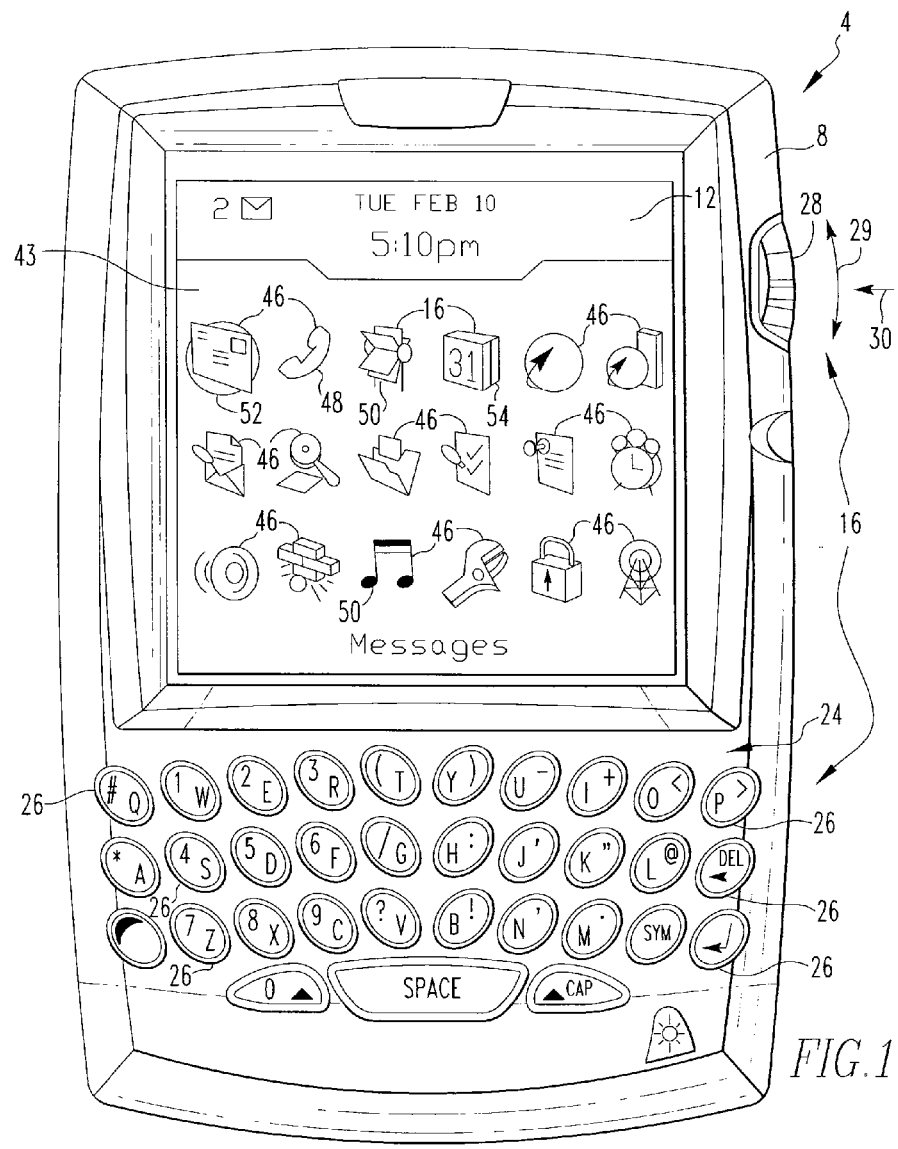
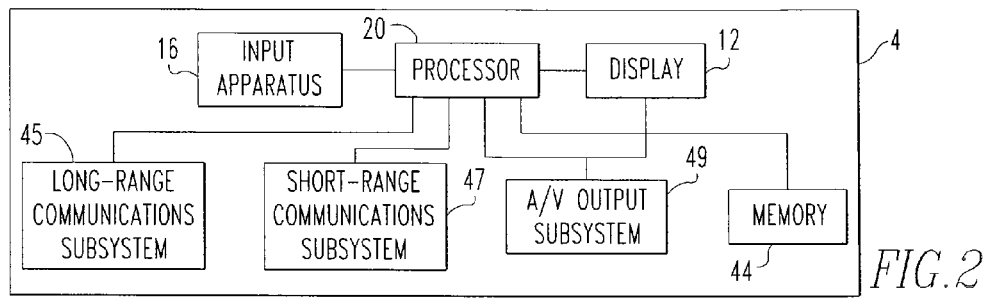
FIG.1
FIG.2

MEDIA TRANSFER AND CONTROL SYSTEM

CROSS-REFERENCE TO RELATED APPLICATION

This application is a continuation-in-part of U.S. patent application Ser. No. 11/733,403, entitled "A Media Transfer And Control System," filed on Apr. 10, 2007.

BACKGROUND

1. Technical Field

The embodiments described herein relate generally to audio/visual (A/V) systems and, more particularly, to a system for wirelessly transferring media files (audio and/or video files) and media descriptive data between an audio/visual system, such as an automobiles audio/visual system or a home entertainment system, and a handheld electronic device and for wirelessly controlling the operation of the audio/visual system from the handheld electronic device.

2. Description of the Related Art

Numerous types of handheld electronic devices are known. Examples of such handheld electronic devices include, for instance, personal data assistants (PDAs), handheld computer, two-way pagers, cellular telephones, and the like. Such handheld electronic devices are generally intended to be portable and thus are relatively small. Examples of handheld electronic devices are included in U.S. Pat. Nos. 6,452,588 and 6,489,950.

Many handheld electronic devices include and provide access to a wide range of integrated applications, including, without limitation, email, telephone, short message service (SMS), multimedia messaging service (MMS), browser, calendar and address book applications, such that a user can easily manage information and communications from a single, integrated device. These applications are typically selectively accessible and executable through a user interface that allows a user to easily navigate among and within these applications.

In addition, handheld electronic devices often include short-range communications functionality that enables the handheld electronic device to communicate wirelessly over a short-range wireless network with other similarly equipped mobile and stationary electronic devices. For example, many handheld electronic devices include a BLUETOOTH® communications module for enabling the handheld electronic device to communicate with other BLUETOOTH® enabled mobile or stationary electronic devices over a BLUETOOTH® short-range wireless network.

As is known in the art, BLUETOOTH® is a wireless technology standard developed by a "Special Interest Group" comprised of members of the telecommunications, computing, and networking industries that allows mobile and stationary electronic devices to communicate with each other over short distances (typically less than 30 feet). BLUETOOTH® uses radio frequency (RF) waves in the 2.4 Gigahertz range, and is designed to be a secure and inexpensive way of connecting between devices without wires. BLUETOOTH® requires that each device be equipped with a BLUETOOTH® communications element, such as the STLC2500 chip sold by STMicroelectronics of Geneva, Switzerland, which includes an RF transceiver element for sending and receiving information according to the BLUETOOTH® standard.

When BLUETOOTH®-capable devices come within range of one another, the devices form an ad hoc network, called a piconet, which may fill a room or may encompass no more distance than that between a cell phone on a belt-clip and a headset on a person's head. Once a piconet is established, the members (which may range from two to eight devices) randomly hop frequencies in unison so they stay in touch with one another and avoid other piconets that may be operating in the same area.

Moreover, some known handheld electronic devices enable the user thereof to store digital media files on the device, such as music or other audio files stored in the well known MP3 format or video files stored in the well known MPEG format (as used herein, the term media file shall mean a digital audio or video file stored in a known or hereafter developed format; a video file may or may not include an audio component), so that the user can, as desired, access the media files and listen to and/or watch the content represented thereby. For example, a user may access a stored music file to listen to the music represented by the file using, for example, a set of headphones or loudspeakers operatively coupled to the handheld electronic device. Similarly, a user may access a stored video file to view and listen to the video content (which typically also includes an audio component) represented by the file using, for example, a display (such as an LCD) provided as part of the handheld electronic device or a set of headphones or loudspeakers operatively coupled to the handheld electronic device (a speaker provided as part of the handheld electronic device may also be used).

In addition, audio/visual systems, such as an audio/visual system provided in an automobile or a home entertainment system, capable of storing and playing digital media files, such as music files stored in an MP3 format or video files stored in an MPEG format, are well known. As used herein, the term audio/visual system shall refer to a system that is capable of performing either or both of audio and video content. Such audio/visual systems are typically controlled by a user interface provided as a part thereof.

U.S. Pat. No. 7,110,755 and United States Patent Application Publication Number 2005/0278080 describe examples of known audio/visual systems that include the capability to receive downloads of music files from separate devices (e.g., using a BLUETOOTH® connection as described above) such as handheld electronic devices. In such audio/visual systems, once the music files are downloaded from the separate device, control of the function and operation of the audio system still must be performed through the user interface of the audio/visual system itself. As will be appreciated, this can, at times, be difficult and/or inconvenient, such as when the device from which music files have been downloaded and the user thereof are not located in close proximity to the user interface of the audio system. In addition, no current systems provide for the transfer of media descriptive data between a handheld electronic device and an audio/visual system to facilitate the creation a synchronized global view on the handheld electronic device and/or the audio/visual system of all of the media content that is currently stored on and/or available through both the handheld electronic device and the audio/visual system. As will be appreciated, such a synchronized global view would appealing and advantageous to a user of the handheld electronic device and the audio/visual system.

BRIEF DESCRIPTION OF THE DRAWINGS

A full understanding of the invention can be gained from the following Description of the Preferred Embodiments when read in conjunction with the accompanying drawings in which:

FIG. 1 is a front view of a handheld electronic device according to one embodiment that may be used in the system shown in FIG. 3 or FIG. 4;

FIG. 2 is a block diagram of the handheld electronic device of FIG. 1;

DETAILED DESCRIPTION

Figure 3:
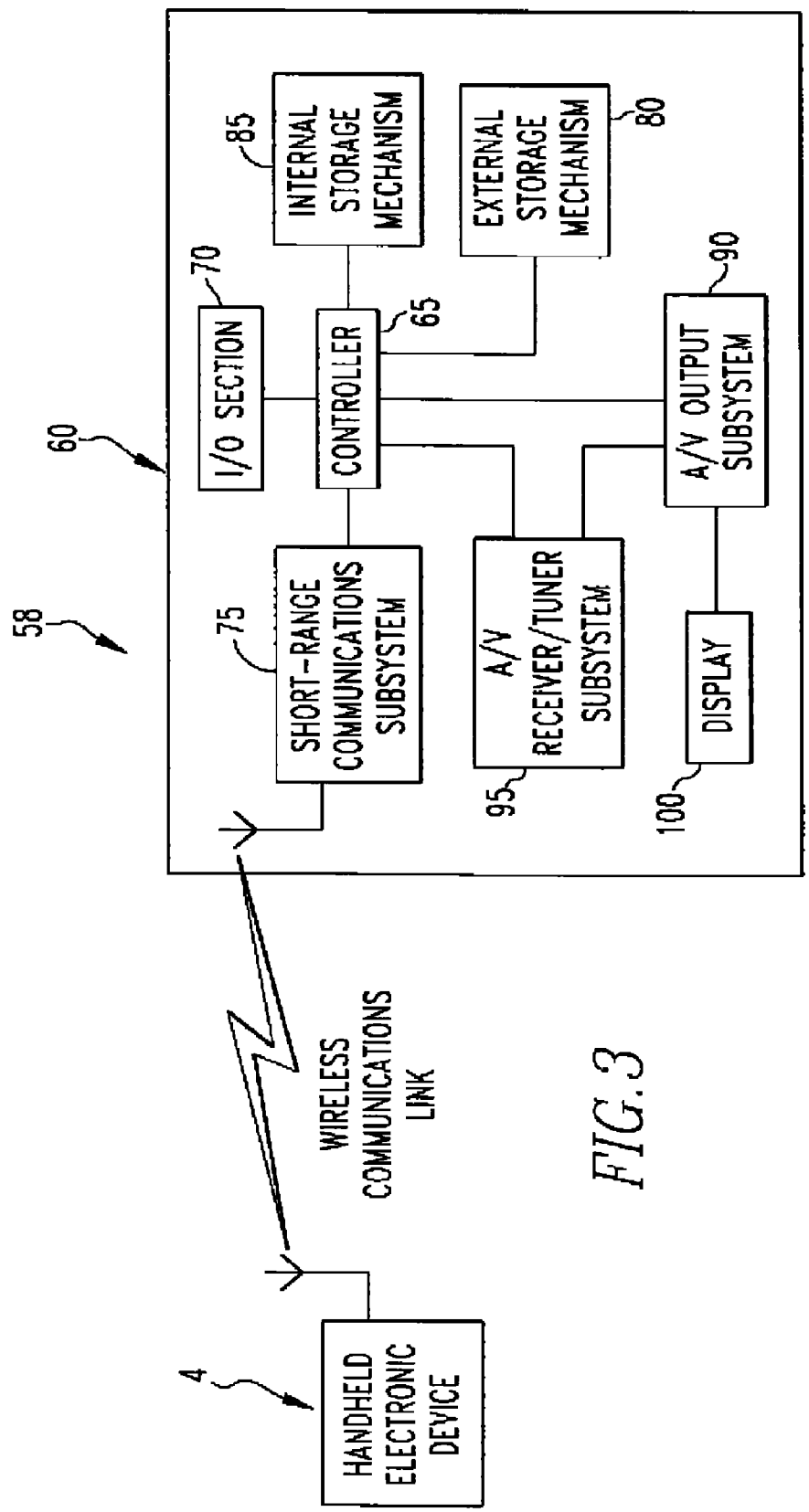
FIG. 3 is a block diagram of an embodiment of a system for wirelessly transferring media and media descriptive data between an audio/visual system and a handheld electronic device and for wirelessly controlling the operation of the audio/visual system from the handheld electronic device.

FIGS. 1 and 2 generally depict an embodiment of a handheld electronic device 4 that may be used in the system shown in FIG. 3 and described in detail elsewhere herein. The handheld electronic device 4 includes a housing 8, a display 12, an input apparatus 16, and a processor 20 (FIG. 2) which may be, without limitation, a microprocessor (μP), a microcontroller, or a custom designed integrated circuit. The processor 20 is responsive to inputs received from the input apparatus 16 and provides outputs to the display 12. Examples of handheld devices are included in U.S. Pat. Nos. 6,452,588 and 6,489,950, which are incorporated by reference herein.

As used herein, the words "handheld electronic device" and "handheld device" are understood to represent the same functional device, with "electronic" being one common current embodiment. Further included in the meaning is any current or future embodiment of the functionality described herein, including but not limited to optical computing and connection means or other logic processing means.

"Exemplar" is used herein to indicate an example, one of a possible plurality, of methods, devices, or items that share some functional or other relational aspect. It is not used to mean a "best" or "preferred" embodiment.

As can be understood from FIG. 1, the input apparatus 16 includes a keyboard 24 having a plurality of keys 26, and a rotatable trackwheel 28. As used herein, the expression "key" and variations thereof shall refer broadly to any of a variety of input members such as buttons, switches, and the like without limitation. The keys 26 and the rotatable trackwheel 28 are input devices or members generally referred to as of the input apparatus 16. Further, input devices include device types not shown, including but not limited to touchscreens, touchpads, voice input, or any other device intended to enable human input. Each of the input devices has a function assigned thereto. As used herein, the expression "function" and variations thereof can refer to any type of process, task, procedure, routine, subroutine, function call, or other type of software or firmware operation that can be performed by the processor 20 of the handheld electronic device 4.

An input subsystem comprises the input devices described above or any of the apparatus 16, being the set of input devices on any embodiment of a handheld device, plus the needed software, firmware, or hardware support to enable operable communication with the processor.

As is shown in FIG. 2, the processor 20 is in operable, typically electronic, communication with a memory 44. The memory 44 can be any of a variety of types of internal and/or external storage media such as, without limitation, RAM, ROM, EPROM(s), EEPROM(s), and the like, that provide a storage register for data storage such as in the fashion of an internal storage area of a computer, and can be volatile memory or nonvolatile memory. The memory 44 further includes a number of applications executable by processor 20 for the processing of data. The applications can be in any of a variety of forms such as, without limitation, software, firmware, and the like, and the term "application" herein shall include one or more routines, subroutines, function calls or the like, alone or in combination.

The word "software" is used herein to mean the entirety of executable code residing anywhere on the handheld device, including but not limited to operating system software, firmware, lower-level device driver and similar software, as well as application software that may use, trigger, or invoke, as needed, portions of software such as the operating system, device driver code, or any other code used to enable, or to execute, any function or action by the processor. Further, for the purposes of this disclosure the words "in electronic communication" include any operable communications means, including but not limited to optical or other logical connection and computation technologies.

In FIG. 1 the display 12 is depicted as displaying a home screen 43 that includes a number of applications depicted as discrete icons 46, including, without limitation, an icon representing a phone application 48, an address book application 50, a messaging application 52 which includes email, SMS and MMS applications, and a calendar application 54. In FIG. 1, the home screen 43 is currently active and would constitute a portion of an application. Other applications, such as phone application 48, address book application 50, messaging application 52, calendar application 54 and media application 56, described in greater detail elsewhere herein, can be initiated from the home screen 43 by providing an input through the input apparatus 16, such as by rotating the trackwheel 28 in the direction indicated by the arrow 29 in FIG. 1 and providing a selection input by translating the trackwheel 28 in the direction indicated by the arrow 30 in FIG. 1.

As is also shown in FIG. 2, the processor 20 is in electronic communication with long-range communications subsystem 45. Long-range communications functions for handheld electronic device 4, including data and voice communications, are performed through long-range communications subsystem 45. Long-range communications subsystem 45 includes an RF transmitter and an RF receiver, or an RF transceiver, and one or more antennas. As used herein, RF transceiver includes both a transmitter and receiver, or, in reference to just sending or just receiving, a transmitter or a receiver respectively. Other known components, such as a digital signal processor and a local oscillator, may also be part of long-range communications subsystem 45. The specific design and implementation of long-range communications subsystem 45 is dependent upon the communications network in which handheld electronic device 4 is intended to operate. For example, handheld electronic device 4 may include a long-range communications subsystem 45 designed to operate with the Mobiltex™, DataTAC™ or General Packet Radio Service (GPRS) mobile data communication networks and also designed to operate with any of a variety of voice communications networks, such as AMPS, TDMA, CDMA, PCS, GSM, and other suitable networks. Other types of data and voice networks, both separate and integrated, may also be utilized with handheld device 4.

The processor 20 is also in electronic communication with a short-range communications subsystem 47. The short-range communications subsystem 47 enables the handheld electronic device 4 to communicate wirelessly over a short-range, e.g., on the order of thirty feet or less, wireless network with other similarly equipped mobile and stationary electronic devices, including, without limitation, other handheld electronic devices, computers, telephones, printers and, as shown in FIG. 3 and described in connection therewith, the audio system 60. The short-range communications subsystem 47 may, for example, include an infrared device and associated circuits and components, or a BLUETOOTH® communication module to provide for communication with similarly-enabled systems and devices. In the preferred embodiment, the short-range communications subsystem 47 includes a BLUETOOTH® communication module for enabling handheld electronic device 4 to communicate with other BLUETOOTH® enabled mobile or stationary electronic devices over a BLUETOOTH® short-range wireless network. The BLUETOOTH communications module comprises a BLUETOOTH® communications element, such as the STLC2500 chip sold by STMicroelectronics of Geneva, Switzerland, that includes an RF transceiver element (or, alternatively, a separate RF transmitter and RF receiver).

Furthermore, according to one aspect of the disclosed embodiments, the handheld electronic device 4 is provided with the capability to store media (e.g., audio and/or video content) in a digital format and selectively show/play such media through, for example, the display 12 and/or a loudspeaker system (not shown) or headphones (not shown). In particular, a number of digital media files may be stored in the memory 44, and such media files may include digital audio files, digital video files, or both. The media files may be stored in an uncompressed format or in a compressed format. For example, in the case of audio files in the form of digital music files, the files may be stored in an uncompressed format similar to the format that may be used to store music files on a CD, or, in a compressed format such as the well known MP3 format defined in MPEG1 or the well known AAC (Advanced Audio Coding) format defined in MPEG2, among others. As seen in FIG. 2, the handheld electronic device 4 further includes an A/V output subsystem 49 that is in electronic communication with the processor 20. The A/V output subsystem 49 preferably includes one or more amplifiers for amplifying analog signals that represent media content, such as music or other audio content, and may include one or more loudspeakers for outputting sound based on the amplified analog signals and/or one or more audio output ports for outputting sound based on the amplified analog signals to, for example, a set of headphones or external speakers. In addition, the A/V output subsystem 49 is operatively coupled to the display 12 to enable the display 12 to display video content that may form part of the media file in question. The media files will usually have other information associated with them, such as artist, titles, timing (play time), and similar data. This information may be in the media file, or may be in information associated with the file. In operation, when a user of the handheld electronic device 4 desires to access stored media content, e.g., listen to selected stored music or watch selected stored video content, the user initiates the media application 56 in the manner described elsewhere herein. Using the media application 56, the user is able to select one or more of the digital media files stored in the memory 44 for play. In response to such a selection, the processor 20 is adapted to access the desired digital media file or files from the memory 44, decompress the media file or files if necessary (e.g., if the files are stored in the MP3 format; as used herein, the term decompress shall include necessary decompression and/or decoding steps), and create one or more analog signals based on the accessed (and decompressed, if appropriate) digital media files using a suitable digital-to-analog converter (preferably provided as part of the processor 20). The one or more analog signals are then provided to the A/V output subsystem 49, which in turn either transmits an audible audio (e.g., music) signal through internal speakers or provides an audio (e.g., music) signal to the output port or ports so that it may be heard through, for example a set of headphones or a set of external speakers. In addition, if the media file is a video file, a properly formatted video signal obtained from the video file is sent to the display 12 for display thereon (which typically is in conjunction with an audio component output as described above).

A/V subsystem 49, as used herein, includes any output device on the handheld whose output or manipulation by the processor is intended to be perceivable by a user. For example, output devices could include a screen, speakers, braille pad, vibration device, or any other output devices. The collection of output devices on a particular handheld device, and the associated functions, is called an A/V subsystem.

FIG. 3 is a block diagram of an embodiment of a system 58 that includes an audio/visual system 60. In one particular embodiment, the audio/visual system 60 is an automobile audio/visual system forming a part of an automobile (not shown). In another particular embodiment, the audio/visual system 60 is a home audio/visual system, commonly referred to as a home entertainment system. It will be appreciated, however, that these embodiments are illustrative only, and that the audio/visual system 60 may be another type of audio/visual system. The audio/visual system 60 includes a controller 65, which may be, without limitation, a microprocessor, a microcontroller or a custom designed integrated circuit. The controller 65 is adapted to control the operation of the audio/visual system 60 generally, and in particular in the manner described elsewhere herein. The audio/visual system 60 also includes an I/O section 70 that is in electronic communication with the controller 65. The I/O section 70 is preferably provided with a number of input buttons or keys for accepting user input instructions for selectively controlling various functions of the audio/visual system 60 and with a display, such as an LCD, for visually providing information to a user relating to the operation of the audio/visual system 60.

The controller 65 is also in electronic communication with a short-range communications subsystem 75 which is similar to and compatible with the short-range communications subsystem 47 of the handheld electronic device 4 (FIG. 2). The short-range communications subsystem 75 enables the audio/visual system 60 to communicate wirelessly over a short-range, e.g., on the order of thirty feet or less, wireless network with other similarly equipped mobile and stationary electronic devices, including, without limitation, the handheld electronic device 4 (to provide the functionality described elsewhere herein), using any of a number of known or hereafter developed wireless technologies and/or protocols. For example, the short-range communications subsystem 75 may include an infrared device and associated circuits and components, or a BLUETOOTH® communication module to provide for communication with similarly-enabled systems and devices. In the preferred embodiment, the short-range communications subsystem 75 includes a BLUETOOTH® communication module for enabling the audio/visual system 60 to communicate with other BLUETOOTH® enabled mobile or stationary electronic devices, including the handheld electronic device 4, over a BLUETOOTH® short-range wireless network. The BLUETOOTH® communications module comprises a BLUETOOTH® communications element, such as the STLC2500 chip sold by STMicroelectronics of Geneva, Switzerland, that includes an RF transceiver element (or, alternatively, a separate RF transmitter and RF receiver).

The audio/visual system 60 further includes an external storage mechanism 80 and an internal storage mechanism 85, both of which are in electronic communication with the controller 65. The external storage mechanism 80 is implemented as, for example, a CD-ROM drive, a DVD-ROM drive, or the like, and is adapted to receive a suitable recording medium, such as a CD or DVD having one or more media files stored thereon in, for example, an uncompressed digital format. The internal storage mechanism 85 is implemented as, for example, volatile and/or non-volatile semiconductor memory or memories (e.g., RAM, ROM, EEPROM, Flash memory, or some combination thereof), and is particularly adapted to store a plurality of media files in a digital format, such as an uncompressed digital format or a compressed digital format like the well known MP3 format defined in MPEG1 or the well known AAC (Advanced Audio Coding) format defined in MPEG2, among others, in the case of digital music files.

In operation, in order to perform/play one or more media files, the controller 65 will, based on and in response to instructions received through the I/O section 70, access the desired digital media files from either the external storage mechanism 80 or the internal storage mechanism 85, as appropriate, decompress the media files if necessary (e.g., if the media files are audio (e.g., music) files stored in the MP3 format), and create one or more analog signals based on the accessed (and decompressed, if appropriate) digital media files using a suitable digital-to-analog converter (preferably provided as part of the controller 65). The one or more analog signals are then provided to an A/V output subsystem 90 provided as part of the audio/visual system 60, which in turn transmits either or both of (depending on the particular type of media involved) an audible audio (e.g., music) signal that can be heard by and a video signal that can be viewed by one or more individuals. For this purpose, the A/V output subsystem 90 may include one or more amplifiers for amplifying the analog signals that are received from the controller 65, one or more loudspeakers for outputting sound based on the amplified analog signals, one or more audio output ports for outputting sound based on the amplified analog signals to, for example, a set of headphones, and/or one or more video output ports for outputting a signal (digital or analog) based on data from the media file for driving a display 100, which may be a television or other monitor, such as, without limitation, an LCD television or LCD monitor. The A/V output subsystem 90 may, in one embodiment, include only audio capabilities as is the case in many of today's automobile audio system, and thus the term A/V is meant to indicate either or both of audio and video capabilities.

As seen in FIG. 3, the audio/visual system 60 also preferably includes an A/V receiver/tuner subsystem 95 (which may include one or more separate components for providing the functionality described herein) for allowing the audio/visual system 60 to receive either or both of radio station signals (e.g., AM and FM) that are transmitted over the air and video signals (e.g., TV stations) that are transmitted over the air or through a wired connection such as a cable system. The A/V receiver/tuner subsystem 95 may also include a satellite radio receiver element to enable it to received satellite radio signals and information as described elsewhere herein. The A/V receiver/tuner subsystem 95 is in electronic communication with and under the control of the controller 65 to control, for example, the particular frequency or channel to which the A/V receiver/tuner subsystem 95 is tuned. Also, the A/V receiver/tuner subsystem 95 is operatively coupled to the A/V output subsystem 90 which generates audile sounds and/or video signals for driving athe display 100 as described elsewhere herein from the signals received by the A/V receiver/tuner subsystem 95. As noted above, the A/V receiver/tuner subsystem 95 may include separate components for receiving radio signals (including satellite radio signals) and video signals, respectively, or may include all such functionality in a single component.

As described elsewhere herein, the handheld electronic device 4, and in particular the memory 44 thereof, may store a plurality of digital media files that may be selectively accessed and played, using the media application 56, through, for example, a loudspeaker system or headphones and/or the display 12 of the handheld electronic device 4 depending on the content of the media (i.e., whether it is audio or video). Furthermore, according to one particular aspect of the audio/visual system 60, the handheld electronic device 4 is able to establish wireless communications with the audio/visual system 60 (specifically between the short-range communications subsystem 47 of the handheld electronic device 4 and the short-range communications subsystem 75 of the audio/visual system 60 using, for example, the BLUETOOTH® protocol) in order to transmit certain media (e.g., audio or video data) and control related information between the handheld electronic device 4 and the audio/visual system 60.

In particular, according to one aspect, a user of the handheld electronic device 4, through the media application 56, can selectively cause the processor 20 to access certain media files stored in the memory 44 and cause those media files to be wirelessly transmitted to the audio/visual system 60. At the audio/visual system 60, the received media files are stored in the internal storage mechanism 85, where they may be later accessed by the controller 65 for play using the A/V output subsystem 90 either as a result of instructions received through the I/O section 70 or as a result of control instructions wirelessly received from the handheld electronic device 4 as described below.

According to another aspect, a user of the handheld electronic device 4, through the media application 56, can selectively cause the processor 20 to access certain media files stored in the memory 44 and cause those media files to be wirelessly "streamed" to the audio/visual system 60 for immediate, real time play by the controller 65 and the A/V output subsystem 90. If the media files to be streamed are stored in the memory 44 of the handheld electronic device 4 in a compressed format, such as the MP3 format, those files may, in one embodiment, first be decompressed by the processor 20 of the handheld electronic device 4 and thereafter be wirelessly transmitted (streamed) as uncompressed digital data which, when received by the controller 65 of the audio/visual system 60 is converted into an analog signal, if needed, and then immediately processed and output as sound and/or video by the A/V output subsystem 90. Alternatively, in another embodiment, if the media files to be streamed are stored in the memory 44 of the handheld electronic device 4 in a compressed format, such as the MP3 format, those files may be wirelessly transmitted (streamed) to the audio/visual system 60 in the compressed format, in which case the controller 65 will immediately decompress the compressed file or files and create an analog signal, if needed, therefrom which is then immediately processed and output as sound and/or video by the A/V output subsystem 90. As will be appreciated, the streaming of media, such as music or video, as described herein may continue for as long as the wireless communications channel between the handheld electronic device 4 and the audio/visual system 60 is maintained.

According to yet a further aspect, a user of the handheld electronic device 4, through the media application 56 and an appropriate user interface provided on the display 12 of the handheld electronic device 4, can selectively cause the processor 20 to generate control signals for controlling the operation of the audio/visual system 60 and cause those control signals to be wirelessly transmitted to the audio/visual system 60 for execution by the controller 65 of the audio/visual system 60. The control signals that may be generated by the handheld electronic device 4 include, in one embodiment, any control signal that can be generated through the I/O section 70 of the audio/visual system 60, or, alternatively, in another embodiment, a selected subset of such control signals. For example, the control signals that may be generated by the handheld electronic device 4 may include, without limitation, signals for controlling the volume of the sound output by the A/V output subsystem 90, the fade and/or balance of loudspeakers forming a part of the A/V output subsystem 90, the tuning of the A/V receiver/tuner subsystem 95 (i.e., the frequency or channel to which it is tuned), the selection and subsequent play (as described elsewhere herein) of music or video files stored in the internal storage mechanism 85 and/or stored on a medium, such as a CD or DVD, received in the external storage mechanism 80, the generation of playlists and the queuing of selected media content such as songs or movies, the skipping forward or backward in a particular piece of media content such as a song or movie, fast forwarding or rewinding in a particular piece of media content such as a song or movie, and the control of repeat and random selection of particular media content such as songs or movies.

According to a further aspect, the embodiments described herein may provide for two-way communication between the handheld electronic device 4 and the audio/visual system 60 (through the short-range communications subsystem 47 and the short-range communications subsystem 75) wherein the communication from the audio/visual system 60 to the handheld electronic device 4 may include: (i) the transfer of media that is stored on the internal storage mechanism 85 and/or the external storage mechanism 80 of the audio/visual system 60 to the handheld electronic device 4 (including on a file by file basis or by streaming as described elsewhere herein), and/or (ii) the transfer of descriptive data (for example, encoded in XML or any other suitable format) relating to that media, such as, without limitation, the name of the song, artist, album, duration, etc., so that the media descriptive data can be displayed on the handheld electronic device 4. In addition, (ii) could happen without (i), meaning that the media files would remain stored on the audio/visual system 60, while the media descriptive data relating thereto is received by and stored and/or selectively displayed on the handheld electronic device 4 so that the user can make a selection on the handheld electronic device 4 and cause the media to be played on the audio/visual system 60 through appropriate command signals sent to the audio/visual system 60 by the handheld electronic device 4 as described elsewhere herein. In addition, the two way communication may also include the transfer from the handheld electronic device 4 to the audio/visual system 60 of descriptive data (for example, encoded in XML or any other suitable format) relating to the media that is stored and available on the handheld electronic device 4. As a result, the handheld electronic device 4 will be able to compile and display on the display 12 one or more "playlists" which indicate the media content that is available for play (on either the handheld electronic device 4, the audio/visual system 60, or both) under the control of the handheld electronic device 4.

The "playlists" just described may indicate whether each particular media file is stored on the handheld electronic device 4, the audio/visual system 60 or both, and may display and or provide access to, such as though a selection operation on the handheld electronic device 4, the descriptive data that is associated therewith. The "playlists" may also be made available for display on the audio/visual system 60 through the I/O section 70.

Furthermore, the two way communication between the handheld electronic device 4 and the audio/visual system 60 may include the communication of media descriptive data from the audio/visual system 60 to the handheld electronic device 4 that includes what is commonly referred to as "sideband" (also "side-band") data relating to the radio/video stations/channels that are being played on and/or available on (i.e., may be played on) the A/V receiver/tuner subsystem 95. As is known, such "sideband" data is commonly provided in connection with satellite radio transmissions (e.g., XM® satellite radio) and is often displayed (selectively) to the user of the audio/visual system 60 though the I/O section 70. The "sideband" data may include, for example and without limitation, the name of the song, artist, album, duration, etc. that is currently being played on the current station, and information relating to other stations/channels that may be received by the A/V receiver/tuner subsystem 95, such as the format (i.e., type of media such as news, sports, country/western, etc.) of the station/channel and the media that is currently playing on or will be played on that station/channel, all of which may be used to facilitate selection and navigation by the user. In particular, as a result of the "sideband" data being sent to the handheld electronic device 4, the user of the handheld electronic device 4 may navigate through and select certain media by, for example, causing the handheld electronic device 4 to scan/search through the "sideband" data to find a particular type of station/channel (e.g., traffic, rock or sports) based on certain user inputs (e.g., search terms or words) or by the user manually searching through the received and displayed "sideband" data to find a particular type of station/channel. Once a selection is made, the handheld electronic device 4 may then issue a control command that is sent to the audio/visual system 60 (in the manner described elsewhere herein) that causes the A/V receiver/tuner subsystem 95 to be tuned/set to the selected station/channel.

Thus, through the above described communications steps, the user of the handheld electronic device 4 will have a synchronized global view on the handheld electronic device 4 of all of the media content stored on and/or available through (e.g., particular radio or TV stations) both the handheld electronic device 4 and the audio/visual system 60, which view will preferably include the descriptive data relating to the media. In one particular embodiment, the above described transfer of media descriptive data (with or without media files) will occur automatically between the handheld electronic device 4 and the audio/visual system 60 as soon as they are within communications range of one another (e.g., as soon as a BLUETOOTH® piconet is established). In other words, the exchange of information between the two "smart devices" (the handheld electronic device 4 and the audio/visual system 60) will occur in an unsolicited manner (i.e., not in response to a command received from the other device to send information), with each device acting as a target or sink for the other. As a result, the synchronized global view of media content available on the handheld electronic device 4 will change dynamically as it comes into and out of range of (e.g., pairs and un-pairs with) different audio/visual systems 60.

To avoid confusion, the words "sideband", "sideband information", "sideband data" and similar uses of sideband will be understood herein to mean or refer to any data about a song, a music station, a type of music, etc. This includes what is typically called "sideband" information for satellite radio stations, as well as meaning the information used to create playlists and other attributes dealing with individual media files. For the later, "sideband" may comprise a title, play time, performer, songwriter, or other information dealing with the specific song, movie clip, etc. When used with radio or television broadcasting, it also includes other information such as the "type" of program or music the media is considered to be. All such information is understood to be within the concept of "sideband information", "sideband data", or similar use of the word "sideband".

The embodiments described herein therefore provide for: (i) the transfer of media files between the handheld electronic device 4 and the audio/visual system 60, (ii) the transmission of control commands from the handheld electronic device 4 to the audio/visual system 60 for controlling the function and operation of the audio/visual system 60 through a user interface provided on the handheld electronic device 4, and (iii) the unsolicited transfer of media descriptive data between the handheld electronic device 4 and the audio/visual system 60 to create a synchronized global view on the handheld electronic device 4 and/or the audio/visual system 60 of all of the media content currently stored on and/or available through both the handheld electronic device 4 and the audio/visual system 60.

In another embodiment, the handheld electronic device 4 is able to download information from a third party source (e.g., a web site) over a communications network such as the Internet relating to the stations/channels that may be currently received by the A/V receiver/tuner subsystem 95 based on, for example, geography (i.e., the current location of the handheld electronic device 4 and the audio/visual system 60), and then the user could make a selection based on the downloaded and displayed data. A control command could then be generated by the handheld electronic device 4 and sent to the audio/visual system 60 (as described elsewhere herein) to cause the A/V receiver/tuner subsystem 95 to be tuned/set to the selected station/channel. Alternatively, the control command could cause the media content form the selected channel to be sent to the handheld electronic device 4. This embodiment would be particularly advantageous when there is no "sideband" data available for the A/V receiver/tuner subsystem 95 that can be transferred to the handheld electronic device 4.

In still another embodiment, the system 58 can be adapted to automatically switch from a mode wherein media content is playing on the handheld electronic device 4 only (as described elsewhere herein) to a mode wherein the media content is streamed to the audio/visual system 60 for play thereby (as described elsewhere herein) as soon as the handheld electronic device 4 and the audio/visual system 60 are within communications range of one another (e.g., as soon as a BLUETOOTH® piconet is established). This switch may occur in the middle of a particular piece of media content, such as in the middle of song. Also, the system 58 can be adapted to automatically switch back to playing media content on the handheld electronic device 4 when the handheld electronic device 4 and the audio/visual system 60 are no longer within communications range of one another. For example, the user may be listening to an album on the handheld electronic device 4 while walking to his or her car. When the user arrives at his or her car, the handheld electronic device 4 will pair with the audio/visual system 60 forming part of the car, and the handheld electronic device 4 will, according to this embodiment, automatically switch to streaming music to the car audio/visual system 60. Then, when the user reaches his or her destination and exits the car, the pairing will be terminated and the handheld electronic device 4 will automatically switch back to playing the music on the handheld electronic device 4 only.

In a further embodiment, the handheld device 4 and system 60 may synchronize themselves for the play switchover at song boundaries. After the two smart systems work together to create a global play list from the combined media files on both, rather than streaming the media data to the system 60, the handheld may send a control signal indicating a timing, the timing being when system 60 is to start ply of the next song (or other media event) on the global list. The handheld will (in most embodiments) have this information, as it knows how long a given media file takes to play, its start time, and therefore its end time. Upon reaching the end time, the handheld will not play the next media file; rather, A/V system 60 automatically play the next song (or other action associated with the next media file). It is also possible to synchronize the play between both systems, with both systems playing the media file concurrently, using timing and sound analysis. This embodiment is significantly more complex than the other two just disclosed, so is not currently expected to be as popular. In high-end handhelds, however, this could be a very nice additional feature over less-expensive handhelds.

As used herein, "play synchronization" or "play synchronicity" refers to any method, included but not limited to those described above, which allows two devices to hand-off playing a sequence of media files, or the play of a single media file, from one device to another in a manner pleasing to the human ear.

In yet another embodiment, the system 58 can be adapted to automatically suppress the playing of media on the audio/visual system 60 (i.e., turn down volume or stop play altogether) by sending a control signal from the handheld electronic device 4 to the audio/visual system 60 when a telephone call is received by the handheld electronic device 4. The system 58 can be also be adapted to automatically resume the playing of media on the audio/visual system 60 (by sending a control signal from the handheld electronic device 4 to the audio/visual system 60) when the telephone call is ended. Alternatively, or in addition to the just described embodiment, the handheld electronic device 4 can be provided with a sensor which senses the current level of ambient noise and can automatically manage the volume of media content that is being played on the audio/visual system 60 (by sending a control signal from the handheld electronic device 4 to the audio/visual system 60) based on the level of ambient noise that is sensed.

In still a further embodiment, the handheld electronic device 4 may store (in the memory 44) a profile for the user that specifies certain operational parameters for the audio/visual system 60, such as, without limitation, volume, fading, speaker balance, etc. As soon as the bandheld electronic device 4 and the audio/visual system 60 are within communications range of one another (e.g., as soon as a BLUETOOTH® piconet is established), the handheld electronic device 4 in this embodiment sends one or more control commands to the audio/visual system 60 which causes the operational parameters for the audio/visual system 60 to be set as specified in the stored profile. In this manner, multiple users of the audio/visual system 60 having different handheld electronic devices 4 with different stored profiles can automatically have the audio/visual system 60 set to suit their preferences.

Figure 4:
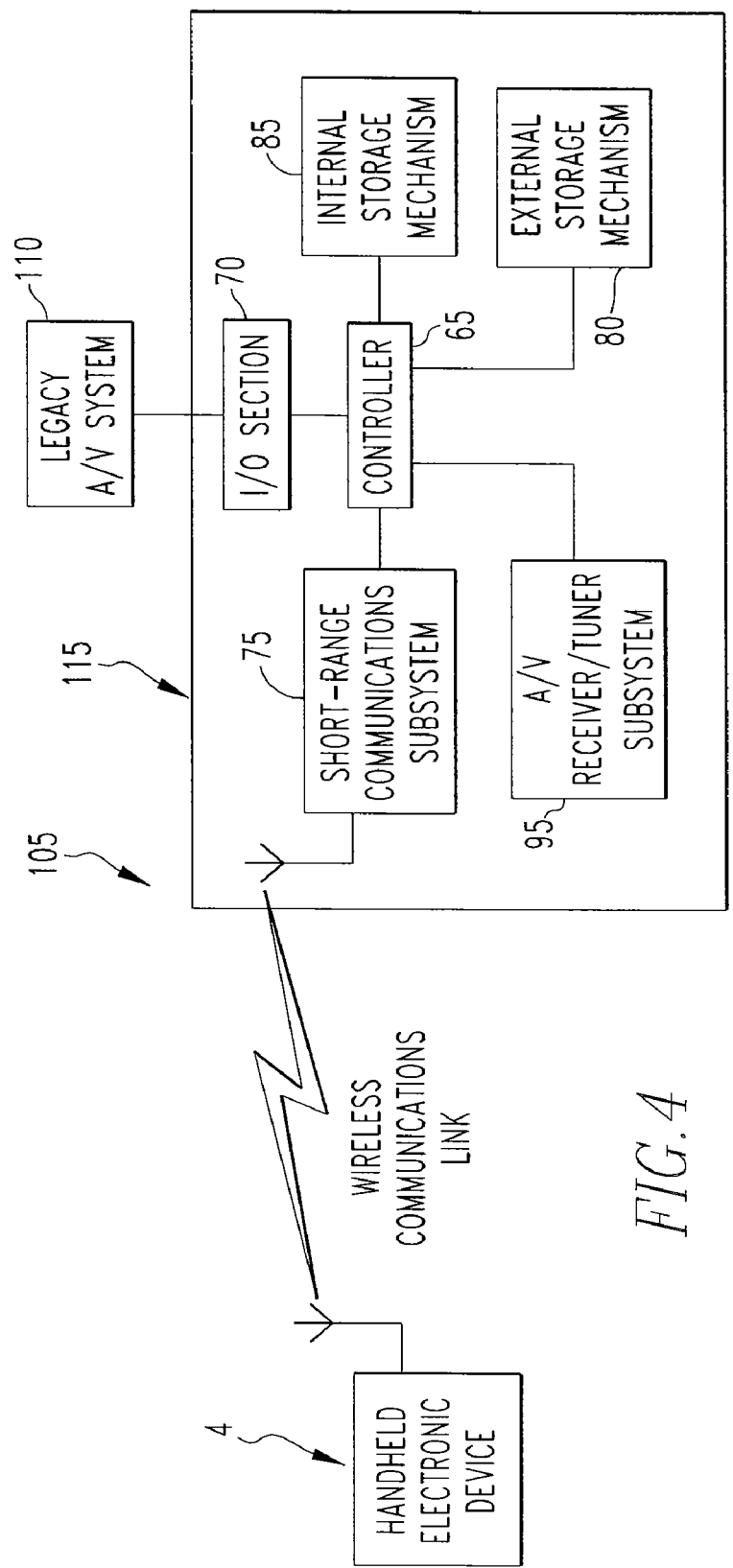
FIG. 4 is a block diagram a system for wirelessly transferring media and media descriptive data between an audio/visual system and a handheld electronic device and for wirelessly controlling the operation of the audio/visual system from the handheld electronic device.

FIG. 4 is a block diagram of a system 105 for wirelessly transferring media files to and controlling the operation of a legacy audio/visual system 110 from a handheld electronic device 4 according to an alternative embodiment. The legacy audio/visual system 110 in this embodiment is an audio/visual system that does not have the wireless communications, computer control and/or media storage capabilities of the audio/visual system 60 shown in FIG. 3. For example, the legacy audio/visual system 110 may be an older audio/visual system such as an older car stereo system or home stereo or video system. As is known, such systems typically include a number of input ports, such as auxiliary and A/V input ports, for making a wired connection thereto. This embodiment, through the use of a wireless interface controller 115, described below, allows the system 115 to have all of the functionality described above in connection with the system 58 in FIG. 3.

As seen in FIG. 4, the system 105 includes a wireless interface controller 115 that is adapted to be connected to the legacy audio/visual system 110 through a wired connection 120. For example, the wired connection 120 may be made to the auxiliary or A/V input port or ports of the legacy A/V system 110. The wireless interface controller 115 includes many of the components of the audio/visual system 60 described elsewhere herein in connection with FIG. 3. In the particular embodiment shown in FIG. 4, the wireless interface controller 115 includes a controller 65, an I/O section 70, a short-range communications subsystem 75, an external storage mechanism 80, an internal storage mechanism 85, and an A/V receiver/tuner subsystem 95. Preferably, the wired connection from the legacy audio/visual system 110 is made through the I/O section 70. The wireless interface controller 115 is able to wirelessly receive media files and control signals from the handheld electronic device 4 (in the same manner as the audio/visual system 60) and cause the media files (which may be stored in the internal storage mechanism 85) to be played through and/or the control signals to be executed through the legacy audio/visual system 110. In this sense, the legacy audio/visual system 110 acts in manner that is similar to the A/V output subsystem 90. For example, and without limitation, media files stored on the handheld electronic device 4 may be wirelessly transmitted from the handheld electronic device 4 in a streaming fashion to the short-range communications subsystem 75 of the wireless interface controller 115 and then, under the control of the controller 65 and through the wired connection 120, be caused to be played on the legacy audio/visual system 110. Also, a control signal may be wirelessly transmitted from the handheld electronic device 4 to the short-range communications subsystem 75 which is then provided to the controller 65, in response to which the controller 65 will access a media file or files stored on the internal storage mechanism 85 or on storage media inserted into the external storage mechanism 80 and cause that accessed media file or files to be played on the legacy audio/visual system 110. In addition, any of the two-way communications that are described elsewhere herein in connection with the audio/visual system 60 in which media descriptive data is transferred between the handheld electronic device 4 and the audio/visual system 60 may occur between the handheld electronic device 4 and the wireless interface controller 115. It should be understood that these examples are not meant to be limiting and that instead the system 105, through the interaction between the wireless interface controller 115 and the legacy audio/visual system 110, may perform any of the functionality described elsewhere herein in connection with the system 58 shown in FIG. 3. In this sense, the wireless interface controller 115 and the legacy audio/visual system 110 together act as an audio/visual system that is similar to the audio/visual system 60 shown in FIG. 3.

Figure 5:
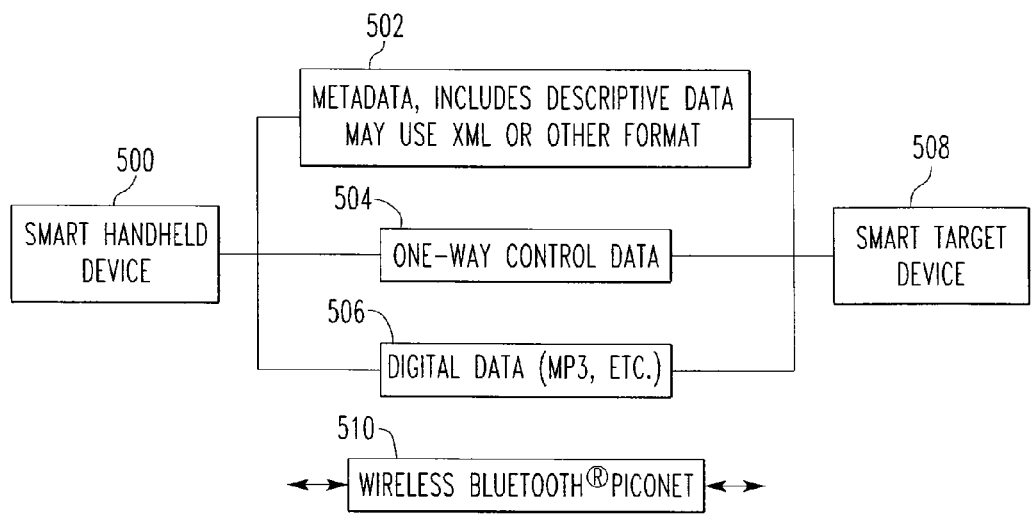
FIG. 5 is a schematic diagram which illustrates a communications stack having a new protocol layer that is used on a BLUETOOTH® piconet.

FIG. 5 is a schematic diagram which illustrates a new protocol layer that is used on a BLUETOOTH® piconet. As seen in FIG. 5, a smart handheld device 500, which may be, for example, the handheld electronic device 4 described elsewhere herein, wirelessly communicates with smart target device 508, which may be, for example, the audio/visual system 60 described elsewhere herein, over a BLUETOOTH® piconet 510. Typically (in prior art systems) BLUETOOTH® has been used to transport digital data, or digital data coupled with one-way control data between a control device and a target device (that need not be a smart device). Exemplar digital data is media data representative of media content (e.g., a song or video content) that is available through the control device or the target device such as, for example, data stored in one or more stored media files, such as an MP3 file. Exemplar one-way control data are control signals that instruct a target device to take specific actions such as: volume up, volume down, put data on a visual display (if applicable, such as the artist playing the current music), and similar commands. As noted above, to use digital data and one-way control data does not require a smart target device.

According to an aspect of the embodiments described herein, a BLUETOOTH® communications stack is provided to enable communication between the smart handheld device 500 and the smart target device 508 that includes a layer for transporting digital data 506 (such as the media data just described), a layer for transporting one-way control data 504 (such as the control signals just described), and a metadata communications layer 502. Using encoding such as XML, the two smart devices (the smart handheld device 500 and the smart target device 508) can pass information back and forth, above the lower layers (the layer for transporting digital data 506 and the layer for transporting one-way control data 504), using the metadata communications layer 502 to allow the cooperative control of A/V equipment and data, including the construction and sharing of media descriptive data relating to media currently available from the smart handheld device 500 and/or the smart target device 508 as described elsewhere herein, such as playlists, selection sequences, user preference templates, and other higher-level information that makes use of the information on the lower layers.

Figure 6:
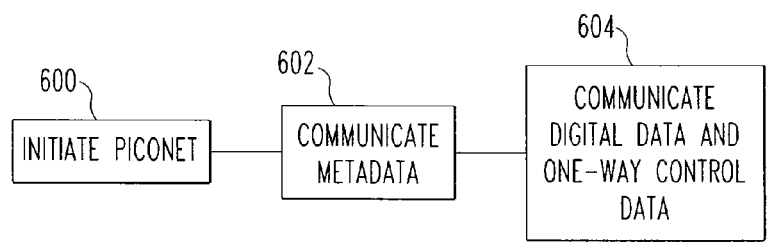
FIG. 6 is a flowchart which illustrates the use of the communications stack shown in FIG. 5.

FIG. 6 is a flowchart which illustrates the use of the communications stack just described. Referring to FIG. 6, the actions corresponding to box 600 include those needed to establish a BLUETOOTH® piconet. This includes the devices (the smart handheld device 500 and the smart target device 508) first becoming aware of each other when they become in range, to finally establishing a piconet between the devices. The particulars of the steps which accomplish this are well known and thus will not be described in detail herein.

Continuing into box 602, the two devices (the smart handheld device 500 and the smart target device 508) use the metadata communications layer 502 to exchange one or more of information about their current states, media descriptive data relating to media currently available from the smart handheld device 500 and/or the smart target device 508, information about the user's (of the smart handheld device 500) preferences, and information needed to execute a cooperative hand-off to allow seamless (to the user) changing of play of media from the smart handheld device 500 to the smart target device 508. The parameters involved in such a handoff may include anything deemed necessary for the pleasure of the listener, including but not limited to the synchronization of the media data being broadcast by each device, the fading of the smart handheld device 500, the increase in volume and/or simultaneous visual display on the smart target device 508, to finally switching over entirely to the smart target device 508. Any and all such considerations can be expressed as data exchanged by the two smart devices to enable the desired level of seamless transfer of output from one device to the next, and are fully contemplated herein.

Moving into box 604, the actions corresponding to this box include all the data that will be transferred using the layer for transporting digital data 506 and the layer for transporting one-way control data 504 of the communications stack shown in FIG. 5. Digital data 506 will almost always be present in some form, as information at the metadata communications layer 502 and associated media (digital) data is exchanged between the two smart devices. The presence of the layer for transporting one-way control data 504 will be optional in some implementations. If the two devices have exchanged enough information using the metadata communications layer 502, there may little or no need for the layer for transporting one-way control data 504. This presence, absence, or amount of use of the layer for transporting one-way control data 504 will be implementation dependent.

Figure 7A:
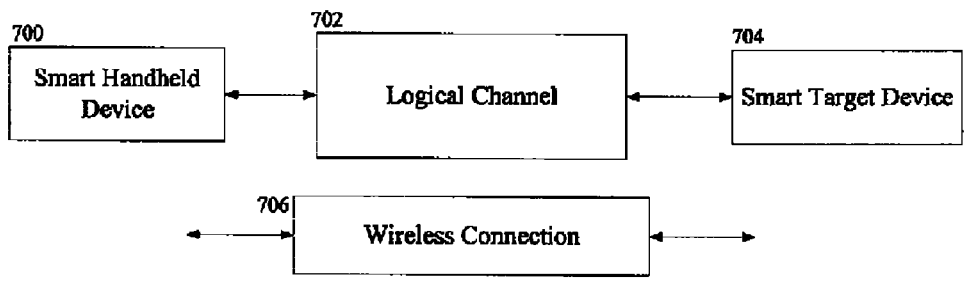
FIG. 7 has block diagrams illustrating the use of single digital channels for data and control information.
Figure 7B:
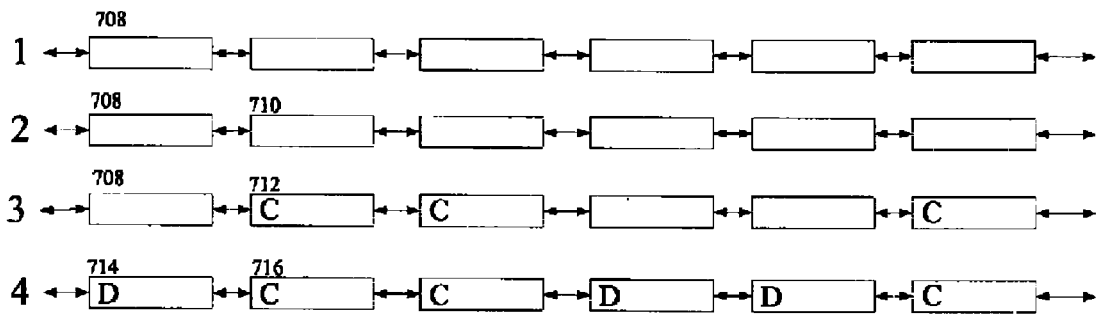

Now discussing FIG. 7, shown in 7a is smart handheld device 700 using a logical channel 702 to be in operable communication with smart target device 704. Logical channel 702 is implemented on wireless connection 706. If this were a BLUETOOTH® application, wireless connection 706 would be the BLUETOOTH® piconet, and logical channel 702 would correspond to the "U" channel (user channel) at the BLUETOOTH® controller-to-host interface. Continuing on to FIG. 7b, illustrated is a packetized logical connection. Packets 7b-1 show a packet stream of data packets. They are all of type 708, containing data. Packet stream 7b-2 has data packets 708, but also has shared data and control information packet type 710. The divider in packet 710 separates the data from the control information. The divider may be fixed, or may be indicated in the packet header. The sender of packet type 710 would include control information, such as a command to turn the volume down, as well as A/V data. The receiver of packet 710 would separate the data from the control information and would pass the separated information to their respective applications. Continuing to packer stream 7b-3, shown are data packets 708 and control information packets 712. The control information packets are entirely devoted to control information, and are indicated by a tag or bit sequence in the header, shown here as a "C" towards the beginning of the packet. Upon receipt, the receiver would separate the two types of packets and send the data or information therein to there respective applications. Finally, also illustrated is packet sequence 7b-4 where there is no default packet type. Each packet has header information which designates its type, illustrated here as either a data packet "D" or a control information packet "C". The packets' information or data is sent to the associated application upon receipt, depending on the packet type.

Figure 7C:
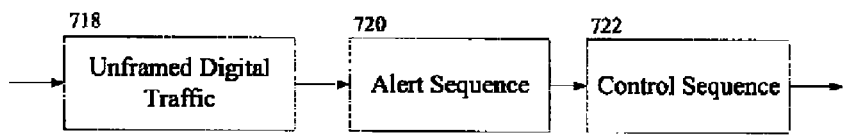

Looking now at FIG. 7c, it is also possible to combine data and control information in unframed digital traffic 718. One way this may be accomplished is to insert an alert sequence 720 in the digital traffic, which alerts the receiver that the bits following the alert are a control sequence rather than continued data sequences. The control sequence 722 is then inserted into the data stream, being separated out by the receiver as a result of the alert signal. Note that the alert may be an integral part of the control sequence, so there may not be a separately inserted alert sequence as shown.

If the wireless communications was embodied in a BLUETOOTH® piconet, then the packet sequences shown generally in 7b could be seen in the "U" channel at the controller/host interface. The "U" channel, itself a logical channel, could be used to implement at least two higher-level logical channels, a data channel and a control information channel. The data and the control information are simultaneously transmitted and received (in the same packet stream).

Continuing with the BLUETOOTH® embodiment, logical data and control information channels may also be implemented using the BLUETOOTH® logical link control and adaptation protocol (L2CAP) module (not illustrated). The L2CAP module, which must be on both the sending and receiving sides, uses the U channel to implement a plurality of higher-level logical channels. Two logical channels, data and control information, may be established between the sender and receiver using the L2CAP module, which handles all the normal issues associated with this type of resource sharing (multiplexing, de-multiplexing, logical channel mutual resource management, QoS, priority, etc.).

Figure 8:
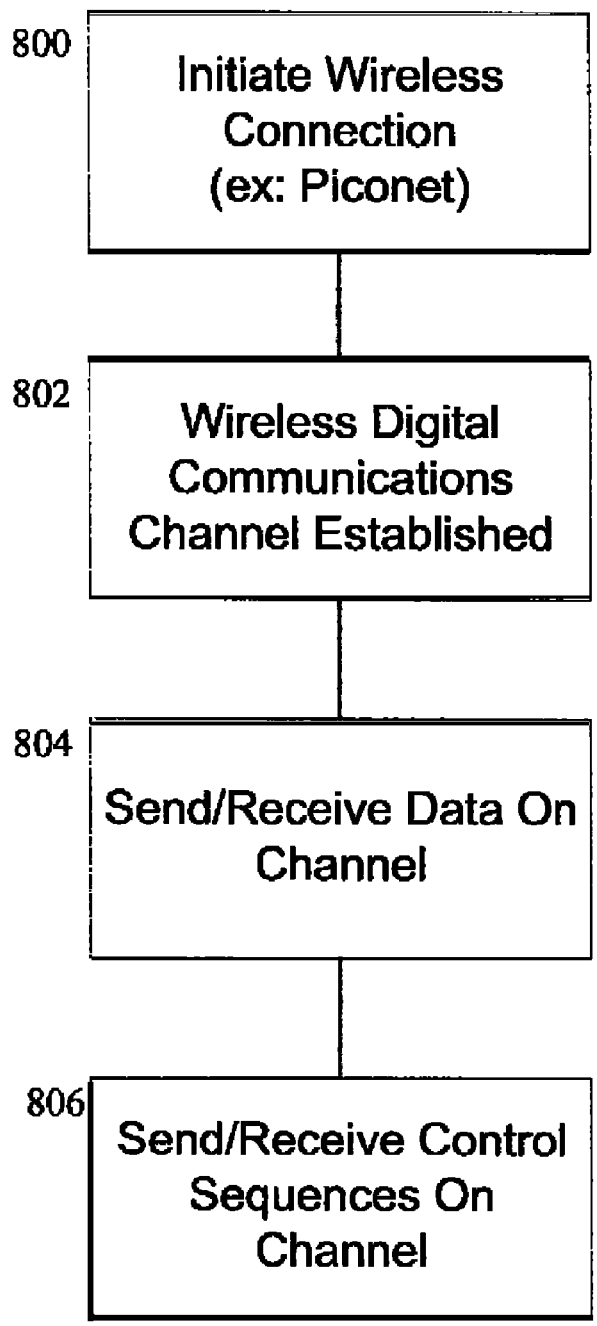
FIG. 8 is a flowchart illustrating use of a single channel for data and control information.

FIG. 8 generally shows the flow for simultaneous sending data and control information over a same digital channel. The actions associated with box 800 are those needed to establish a wireless connection between two devices. The particulars will depend on the embodiment; for a BLUETOOTH® wireless connection this is the establishment of a piconet; for a simple IR connection this may mean simply having the transmitting and receiving controllers in the two devices powered up, having been previously programmed to understand each others' signals. Continuing into box 802, the actions are those needed to set up a digital communications channel in a manner consistent with the underlying wireless connection. In the exemplar BLUETOOTH® embodiment, this corresponds to the "U" channel being available at the controller/host interface. In the exemplar IR embodiment, the channel exists as a result of the devices being able to transmit and receive (there is a single digital communications channel). The actions corresponding to box 804 are any and all those required involved with sending/receiving data (i.e., MP3 files or streamed music) over the digital channel established in box 802. The actions corresponding to box 806 are any and all those associated with sending/receiving control sequences on the same digital channel that was established in box 802. The method used to simultaneously send/receive data and control information on a same digital channel will depend on the underlying wireless technology and the associated digital channel; exemplar embodiments were discussed in FIG. 7.

FIGS. 7 and 8 illustrate various methods and devices usable to allow both data (A/V data in particular) and control sequences to be interspersed on a same digital channel. This results in the data and control information being sent and received functionally simultaneously, without apparent interruption.

Thus, the embodiments described herein provide systems wherein media files can be downloaded from a handheld electronic device to an audio/visual system, such as, without limitation, an automobile audio/visual system or a home entertainment system, wherein the same handheld electronic device can also control the function and operation of the audio/visual system through a user interface provided on the handheld electronic device by sending control instructions. This may also be called control information, and means any information sent to the A/V system that in any ways affects the A/V system, including but not limited to the media currently stored, on either the handheld or the remote A/V system. Typically the effect will have to do with the playing of the media, how or in what order, but it is not limited to that type of information. For example, also included is control information that might change how a display appears, changes side-band data displays, a possible future order of media to be played, a preference for competing media that is only probabilistically going to be played at a future time, the exchange of media files, synchronization of play between the handheld and the A/V system, etc.

While preferred embodiments have been described and illustrated above, it should be understood that these are exemplary and are not to be considered as limiting. Additions, deletions, substitutions, and other modifications can be made without departing from the spirit or scope hereof. Accordingly, the invention is not to be considered as limited by the foregoing description but is only limited by the scope of the appended claims.

What is claimed is:

1. A handheld device comprising:
   a processor;
   a memory configured to store a plurality of media files and in operable communication with said processor;
   an RF transceiver adapted for wireless communications and in operable communication with said processor;
   an input subsystem in operable communication with said processor, the input subsystem comprised of at least one input component;
   an output subsystem in operable communication with said processor, said output subsystem comprised of at least one output component;
   wherein said processor, with executable software, is configured to:
      receive via said RF transceiver, information about media files not in said memory, said information not received in response to input from said input subsystem;
      integrate said received information with information about any media files in said memory;
      send, to said output subsystem, said integrated information;
      send, using said RF transceiver, some side-band information on a currently-playing media file and a next media file;
      receive, from said RF transceiver, an indicator which indicates if the media file associated with said sent side-band information is or is not resident on an A/V system associated with said indicator; and
      send, using said RF transceiver, one of: a copy of the currently-playing media file only if said indicator indicates the currently-playing media file is not resident and a copy of the next media file only if said indicator indicates the next media file is not resident; and, only sends a copy of the next media file only if said indicator indicates the next media file is not resident.

2. The handheld device of claim 1 where said processor is configured to receive input from said input subsystem, said input indicating an ordered list in which to play said media files, including media files not in said memory.

3. The handheld device of claim 2 where said processor is configured to:
   send, using said RF transceiver, a request for copies of any media files that will be needed to play the ordered list;
   receive, using said RF transceiver, the requested media files;
   send, according to the ordered list, output to said output subsystem, the output based on said media files.

4. The handheld device of claim 2 where said processor is configured to:
   send, using said RF transceiver, control information comprised of said ordered list; and,
   send, using said RF transceiver, media files on said ordered list whose information was not from said memory in said handheld.

5. The handheld device of claim 1 where said processor is configured to:
   send, using said RF transceiver, a control signal indicating said currently-playing media file is to be played in synchronicity with the handheld, if play synchronicity is functionally available;
   send, using said RF transceiver, a control signal indicating when to being playing said next media file if play synchronicity is not functionally available.

6. The handheld device of claim 1 where said processor is configured to send, using said RF transceiver, control information and media files on a same digital channel.

7. The handheld device of claim 6 where said digital channel is configured for use as two logical channels, each logical channel usable concurrently.

8. The handheld device of claim 6 where said digital channel is a packetized channel.

9. The handheld device of claim 8 where said digitized, packetized channel is further configured as two logical packetized channels.

10. The handheld device of claim 8 where said digitized, packetized channel is embodied as a "U" channel in a BLUETOOTH® piconet.

11. A method of using a handheld device comprising:
    storing at least one media file on a memory in said handheld device, said memory configured to store a plurality of media files;
    receiving, using an RF transceiver adapted for wireless communications in said handheld device, sideband information about media files, said sideband information not received in response to an input from an input subsystem on said handheld device;
    comparing, using said sideband information, media files available in said memory and media files associated with said sideband information;
    creating an integrated list of media files using said received information with information about media files in said memory;
    sending, to an output subsystem in said handheld device, a representation of said integrated information;
    sending, using said RF transceiver, some side-band information on a currently-playing media file and a next media file;
    receiving, from said RF transceiver, an indicator which indicates if the media files associated with said sent side-band information are or are not resident on an A/V system associated with said indicator;
    sending, using said RF transceiver, one of: a copy of the currently-playing media file if said indicator indicates the currently-playing media file is not resident and a copy of the next media file if said indicator indicates the next media file is not resident; and,
    sending a copy of the next media file only if said indicator indicates the next media file is not resident.

12. The method of claim 11 comprising receiving input from an input subsystem in said handheld device, said input one of indicating or accepting an ordered list in which to play said media files, including media files not in said memory.

13. The method of claim 12 comprising:
    sending, using said RF transceiver, a request for copies of any media files that will be needed to play the ordered list;
    receiving, using said RF transceiver, the requested media files;

sending, according to the ordered list, output to an output subsystem on said handheld, the output based on said media files.

14. The method of claim 11 comprising:
sending, using said RF transceiver, control information comprised of said integrated information; and,
sending, using said RF transceiver, media files associated with said integrated information whose sideband information was not in said received sideband information.

15. The method of claim 11 comprising:
sending, using said RF transceiver, a control signal indicating said currently-playing media file is to be played in synchronicity with the handheld, if play synchronicity is functionally available; and
sending, using said RF transceiver, a control signal indicating when to being playing said next media file if play synchronicity with the currently-playing media is not functionally available.

16. The method of claim 11 comprising sending, using said RF transceiver, control information and media files on a same digital channel.

17. The method of claim 16 where said digital channel is configured for use as two logical channels, each logical channel usable concurrently.

18. The method of claim 16 where said digital channel is a packetized channel.

19. The method of claim 18 where said digitized, packetized channel is configured as two logical packetized channels.

20. The method of claim 18 where said digitized, packetized channel is a "U" channel in a BLUETOOTH® piconet.

* * * * *